United States Patent [19]
Imme et al.

[11] 3,819,169
[45] June 25, 1974

[54] TELESCOPING SHIELD SPRING

[75] Inventors: Helmut Imme, Friedberg; Robert Blaimberger; Gunter Schulz, both of Augsburg, all of Germany

[73] Assignee: Fa. J. N. Eberle & Cie. GmbH, Augsburg, Germany

[22] Filed: Apr. 17, 1972

[21] Appl. No.: 244,500

[30] Foreign Application Priority Data
Apr. 17, 1971 Germany............................ 2118728

[52] U.S. Cl.................. 267/155, 267/156, 267/180
[51] Int. Cl............................................... F16f 1/08
[58] Field of Search ............ 267/156, 166, 62, 155, 267/180

[56] References Cited
UNITED STATES PATENTS
291,009   12/1883   Williams ........................... 267/180
2,741,476   4/1956   Burney.................................. 267/62
2,932,503   4/1960   Le Van................................ 267/156

*Primary Examiner*—James B. Marbert
*Attorney, Agent, or Firm*—Karl F. Ross; Herbert Dubno

[57] ABSTRACT

A telescoping shield spring is formed as a frustoconical tube from a spring-steel band wound upon itself with a progressively steeper(greater) pitch from its ends toward its middle. Each end carries a sleevelike end piece, the piece at the large-diameter end surrounds the spring with slight clearance and the piece at the small-diameter end is tightly received within the spring.

10 Claims, 3 Drawing Figures

PATENTED JUN 25 1974　　　　　　　　　　　　　　　　3,819,169

TELESCOPING SHIELD SPRING

FIELD OF THE INVENTION

The present invention relates to a telescoping spring. More specifically this invention concerns such a spring used as a shield for a shaft, tie rod, connecting rod, or the like.

BACKGROUND OF THE INVENTION

It is known to use a telescoping spring shield to protect precision spindles of expensive tool-making machinery, shafts of displaceable machine elements, and the like. Such a shield protects the elongated member passing through it from dirt, physical damage impact, and water. mobility Such a shield must remain out of contact with the member it is protecting regardless of its position. To this end when horizontal it must not sag to the extent that it will touch the shaft or rod passing through it. Such sag or bowing of the shield is often allowed for by providing a size larger shield than that which is strictly necessary. Unfortunately this leads to increased expense and often is impossible when space is at a premium. Even when the shield is in a vertical position such transverse mobitklity is a problem.

OBJECTS OF THE INVENTION

It is therefore an object of the present invention to provide an improved spring of the above-described general type.

Another object is the provision of such a spring shield for elongated members which seals against itself very tightly so as to completely exclude foreign matter from its interior.

Yet another object is to provide a helical-spring shield of exceptional stiffness so that it just clears the element being protected without ever touching it.

SUMMARY OF THE INVENTION

These objects are attained according to the present invention by forming the shield of a resilient band which is wound around itself and has the general shape of a frustum. The pitch progressively increases, that is becomes steeper, towards an intermediate region of the spring, becoming shallower toward each end. The spring itself has the overall shape of a slightly tapered tube. The spring according to the invention is of the telescoping spiral type, being a spring band having a normal extended condition and resisting axial displacement (contraction or elongation). The spring has at least $N$ turns where $N = L/W$, $L$ being the normal axial length of the spring and $W$ the width of the band. In the normal position the turns overlap by 0.1 W to 0.9 W, and the actual number of turns may range from 1.1N to say 10N. The band is of uniform thickness over the entire spiral and the width may be five or more times greater than the thickness.

Such a spring is extremely stiff in its middle or intermediate region because of the steep pitch of its winding in this region. At the same time the shallower pitch is has at its ends permits the spring to be axially compressed as easily as if it had the same pitch all along its length as in prior-art shields of this type.

Axial compression of the spring according to the invention will never result in any of the turns coming apart and subsequently jamming. On the contrary the spring expands and contracts with at first the tighter outer turns shifting and thereafter the more steeply pitched inner turns moving over one another, with a tight seal being insured at all times.

The ends of the spring in a relaxed condition are not planar, but a portion of the band end projects slightly. On compression this end portion is pushed in to make the end planar, but due to the shallow pitch adjacent this end no opening will be formed in the shield. The terms "steep pitch" and "shallow pitch" have been used herein to mean large and small pitches respectively, as known to the screw-thread art. They also correspond to a large and a small pitch angle.

According to another feature of the present invention the band forming the spring is coated with a low-friction material such as Teflon (polytetrafluoraethylene) or Viton (fluoroelastomer) both products of E. I. DuPont de Nemours and Company.

Another feature of the invention provides end members for such a telescoping spring shield. The members take the form of sleeves, the sleeve at the smaller spring end being received inside the spring and the sleeve at the other end surrounding the spring. The inside sleeve has a diameter which is slightly greater than the inside diameter of the spring at its narrower end so that it pre-stresses this spring end outwardly slightly. On the other end the other sleeve surrounds the larger spring end with a slight amount of play to allow for expansion of the end without excessive deformation of the spring which would lead to opening the admission of foreign matter.

DESCRIPTION OF THE DRAWING

The above and other objects, features, and advantages will become apparent from the following description, reference being made to the accompanying drawing in which.

SPECIFIC DESCRIPTION

Figure 1:
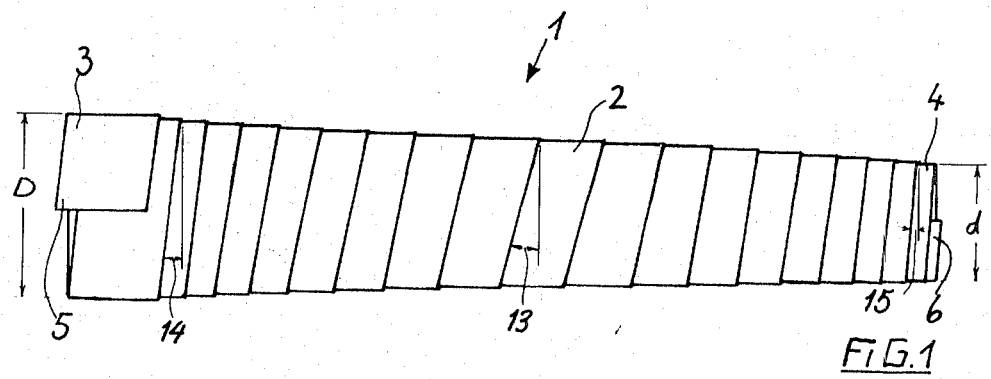
FIG. 1 is a side view of the spring according to the present invention, here in a relaxed condition.

As shown in the FIGURES the spring according to the present invention comprises a spirally wound telescoping spring-steel band 1 having a large-diameter end 3 and a small diameter end 4, with an intermediate region or middle 2. More specifically this band 1 is wound tightly on itself so that adjoining turns overlie (overlap) and engage each other, making the spring frustoconically tubular.

It can be seen how the band 1 is wound with increasingly steeper pitch towards its middle 2. The band has a pitch 13 of substantially 13° at its middle 2 and pitches of 6° and 4° at its large and small ends 14 and 15, respectively. Thus, the pitch 13 at the middle is at least twice as steep as at either of the ends.

Figure 2:
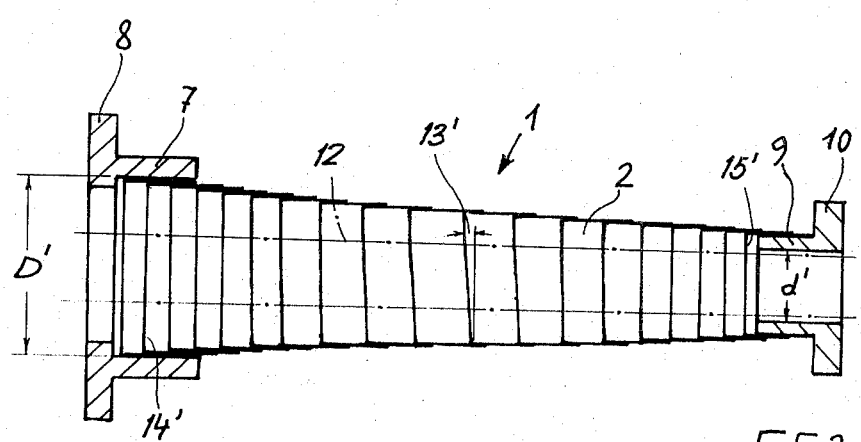
FIG. 2 is an axial section through the spring braced between a pair of surfaces.

FIG. 2 shows how end members 7 and 9 formed with flanges 8 and 10 are provided at the ends 3 and 4, respectively, of the spring 1. Both end pieces 7 and 8 are formed as short sleeves so that a shaft 12 (dot-dash lines) may pass through the telescoping shield formed by the band 1. The end piece 7 for the larger end 3 has an inside diameter D' which is slightly greater than the outside diameter D of the large end of the spring 1.

Conversely the end piece 9 has an outside diameter $d'$ which is greater than the inside diameter $d$ of the smaller end of the spring 1. Thus the inside end piece 9 prestresses that end of the spring outwardly to maintain the turns of the coil in close contact with each other. At the same time the larger diameter $D'$ of the end piece 7 allows some expansion of the spring 1 and rotation of the end 3 on spring compression.

The spring 1 is shown in a partially axially compressed condition in FIG. 2. In this position the end pitches 14' and 15' drop to practically zero, here merely 1°, and the center pitch 13' is reduced to 5°. Since in the relaxed position shown in FIG. 1 the ends 5 and 6 of the band 1 project slightly from the end of the spring it can be seen how in the compressed condition these ends 5 and 6 are pushed into the spring to make the spring end planar.

Figure 3:
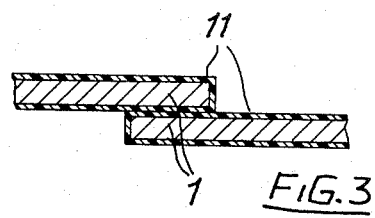
FIG. 3 is an enlarged detail view of a section of the spring according to the present invention.

FIG. 3 shows how the band 1 may be provided with a Teflon coating 11 having a low coefficient of friction in order to allow virtually friction free gliding of the turns of the spring on each other. Such a coating is sprayed on the spring.

We claim:

1. A telescoping spring comprising a band of resilient material wound spirally into the shape of an elongated frustoconical tube having a small-diameter end and a large-diameter end, said tube being of increasing pitch from each of its ends toward the middle of the tube.

2. The spring defined in claim 1 wherein said band has ends projecting from the ends of said tube.

3. The spring defined in claim 1 wherein said band is provided with a coating having a low coefficient of friction.

4. The spring defined in claim 1, further comprising a sleeve received in the small-diameter end of said frustoconical tube, said sleeve having an outside diameter at least as great as the inner diameter of said small end.

5. The spring defined in claim 4 wherein said outer diameter is greater than said inner diameter.

6. The spring defined in claim 5, further comprising a second sleeve receiving the large-diameter end of said frustoconical tube, said second sleeve having an inner diameter at least as great as the outer diameter of said large-diameter end.

7. The spring as defined in claim 6 wherein said inner diameter of said second sleeve is greater than said outer diameter of said large-diameter end.

8. The spring defined in claim 7 wherein said band has a width W at least five times greater than its thickness and a number of turns $N \geq L/W$ where L is the length of the spring, the turns overlapping adjacent turns by 0.1W to 0.9W.

9. The spring defined in claim 8, further comprising an elongated member extending through the spring and bridging said tubes.

10. The spring defined in claim 9 wherein said band consists of metal sprayed with a polytetrafluoroethylene or a fluoroelastomer.

* * * * *